Nov. 17, 1925.                                                        1,562,341
                              A. B. KNIGHT
         METHOD OF AND APPARATUS FOR GLAZING AND POLISHING GLASSWARE
                     Filed Dec. 13, 1923      3 Sheets-Sheet 2
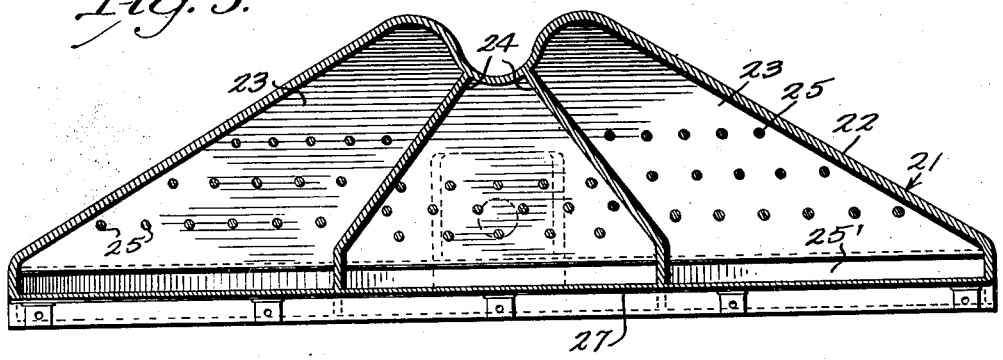
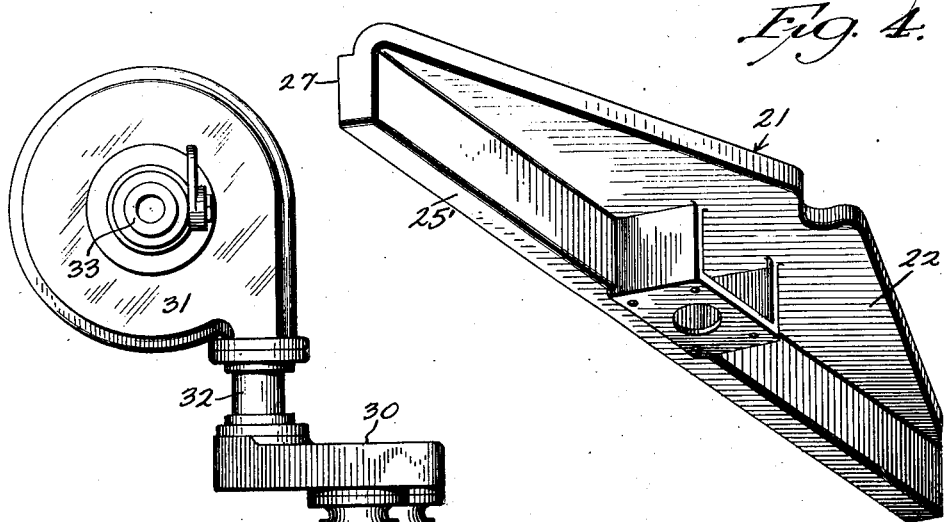
Inventor
ALBERT B. KNIGHT
By
Attorney

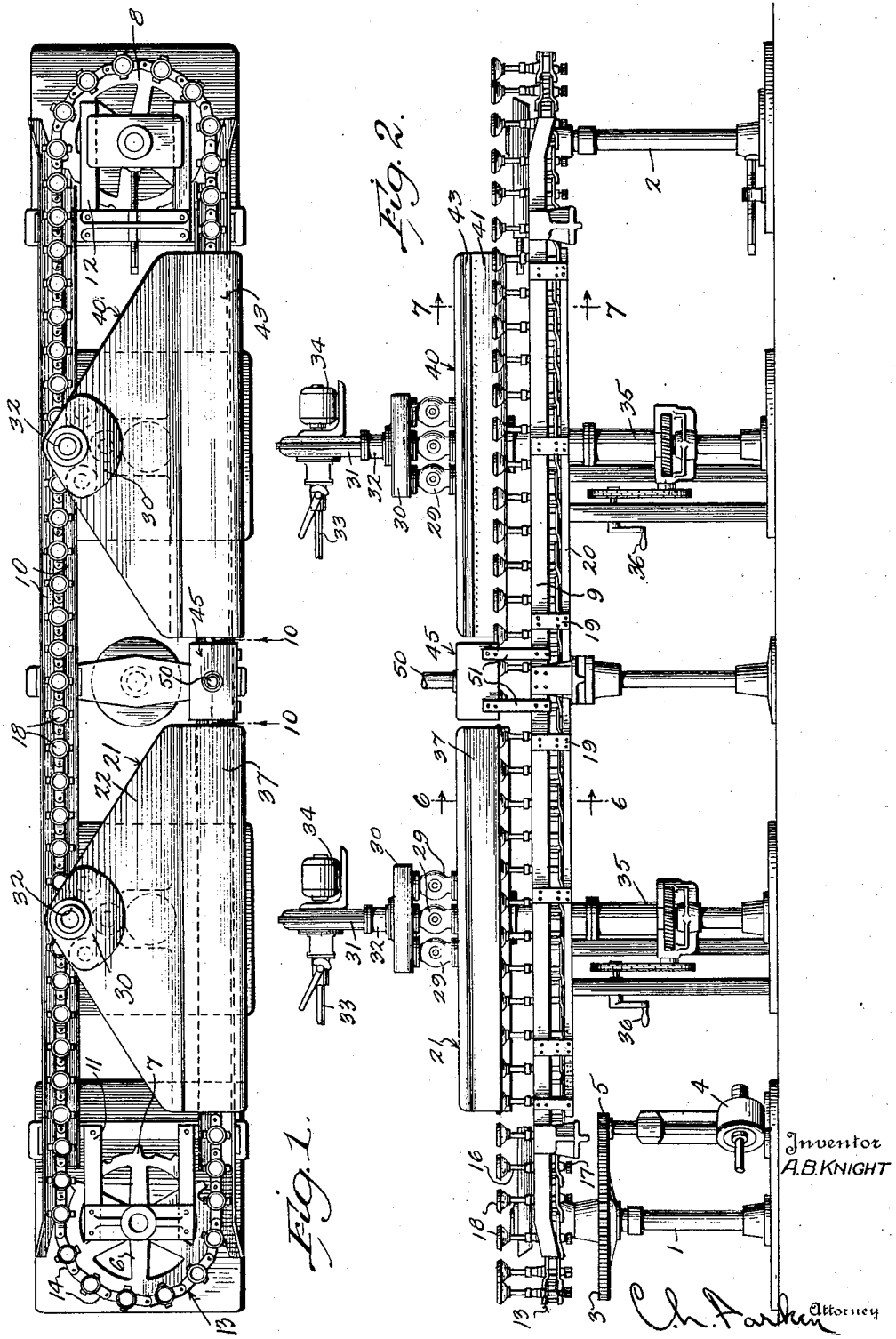

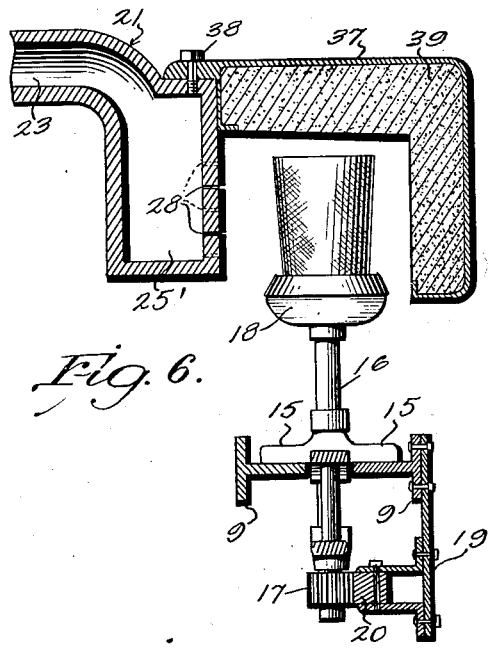
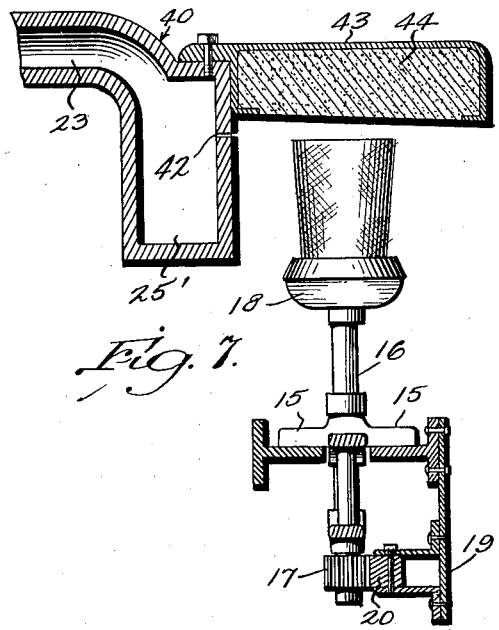
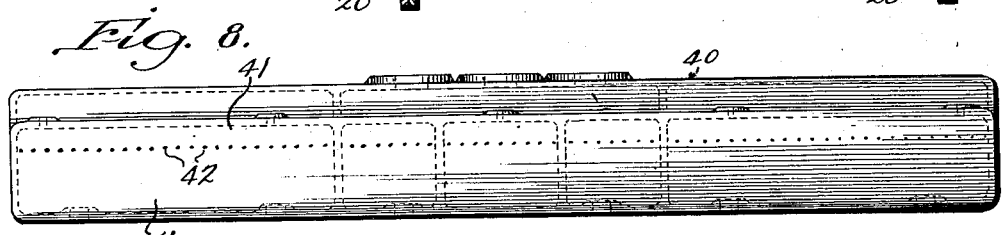
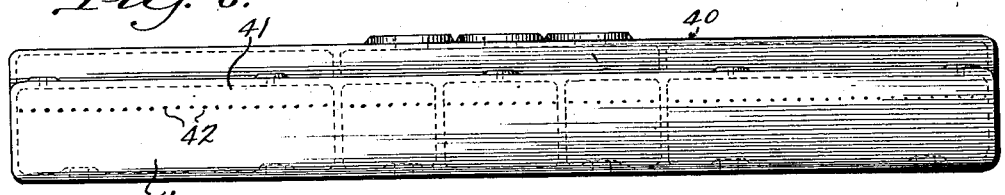
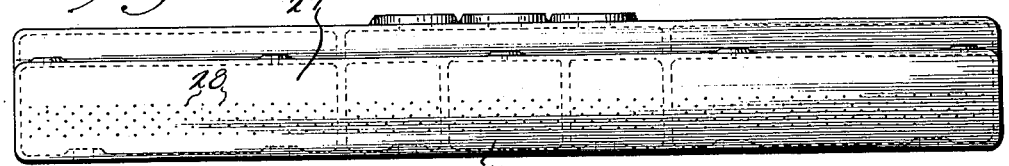
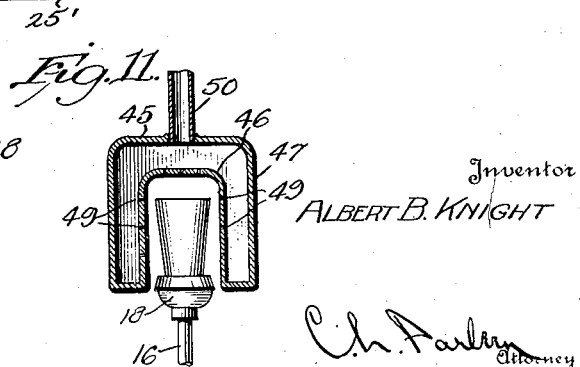

Patented Nov. 17, 1925.

1,562,341

UNITED STATES PATENT OFFICE.

ALBERT BREAKENRIDGE KNIGHT, OF FAIRMONT, WEST VIRGINIA.

METHOD OF AND APPARATUS FOR GLAZING AND POLISHING GLASSWARE.

Application filed December 13, 1923. Serial No. 680,519.

*To all whom it may concern:*

Be it known that I, ALBERT BREAKENRIDGE KNIGHT, a citizen of the United States, residing at Fairmont, in the county of Marion and State of West Virginia, have invented certain new and useful Improvements in Methods of and Apparatus for Glazing and Polishing Glassware, of which the following is a specification.

This invention relates to a method of and apparatus for polishing and glazing glassware and more particularly pressed ware such as tumblers, sherbet glasses and the like.

It is the present practice to introduce pressed ware into the flames of a polishing burner whereby the entire body of glass is highly heated and the roughened surface glass is raised to the fusing point whereby it runs to form a smooth outer surface upon the glass. At a later period the glass is again introduced into the flames of a glazing burner in order that the upper edges of the ware may be heated to the fusing point whereby the edges of the glass will run smooth and form a glazed edge. It has been found wholly impracticable to glaze glasses immediately after they have been polished for the reason that the introduction of the ware to the glazing burner immediately after it has been highly heated by the polishing burner softens the glass to such an extent that it loses its form.

An important object of the present invention is to provide a method of treating the glassware between the polishing and glazing operations so that the glazing operation may be performed immediately after the polishing operation has been completed.

A further object of the invention is the provision of a unitary machine for polishing and glazing glasses substantially in a single operation.

A further object is the provision of a polishing burner and a glazing burner arranged end to end, means for dissipating the heat from the ware as it passes from the polishing burner to the glazing burner and means for continuously moving the glassware progressively past the polishing burner, the heat dissipating means and the glazing burner.

Other objects and advantages of the invention will be apparent during the course of the following description.

In the drawings, I have shown one embodiment of the invention. In this showing,

Figure 1 is a plan view of the apparatus,
Figure 2 is a side elevation,
Figure 3 is a horizontal sectional view through one of the burners,
Figure 4 is an under side perspective of the same,
Figure 5 is a side elevation of one of the burners and associated elements, parts being broken away,
Figure 6 is a section taken on line 6—6 of Figure 2,
Figure 7 is a similar view on line 7—7 of Figure 2,
Figure 8 is a face view of the glazing burner,
Figure 9 is a similar view of the polishing burner,
Figure 10 is a section taken on line 10—10 of Figure 1, and,
Figure 11 is a section taken on line 11—11 of Figure 10.

In the present method I provide a burner casing having a flat relatively long outer face drilled to provide burner nozzles adapted to project flames outwardly against the surfaces of the glassware. A conveying means is provided for moving the glassware slowly past said burner nozzles whereby the ware is heated to a high temperature and the roughened surface portions are fused to provide a polished surface. From the polishing burner the conveyor moves the ware through a hood into which fairly warm air is fed under pressure, and this air is directed against the glassware to carry off or dissipate a material portion of the heat therein. From the hood the conveyor moves the glassware past a burner similar to the polishing burner except that it is drilled to project flames across the upper edges of the glassware to glaze the upper edge. I have found that the provision of the heat dissipating means permits the temperature of the glassware to be lowered materially without danger of breakage whereby it maintains its form under the intense heat of the glazing burner. Thus it will be seen that my method comprises polishing the ware, immediately dissipating heat therefrom so as to materially lower its temperature, and immediately moving the ware into the flames of a glazing burner. The practice of the method permits a single operator to operate a single machine of large capacity wherein the polishing and glazing operations are quickly carried out without loss of time.

Referring to the drawings showing the apparatus, the numerals 1 and 2 designate vertical standards mounted at opposite ends of the machine. The standard 1 rotatably supports a gear 3 adapted to be driven by an electric motor 4 through a suitable pinion 5. A sprocket 6 is secured to the gear 3 thereabove and this sprocket is provided with teeth 7 for a purpose to be described. The standard 2 rotatably supports a sprocket 8 similar in construction to the sprocket 6 previously described.

The numeral 9 designates a pair of spaced rails mounted adjacent the front of the machine, and each of these rails are substantially T-shaped as shown in Figures 6 and 7. A similar pair of rails 10 are mounted adjacent the rear of the machine as shown in Figure 1. The rails 9 and 10 are adapted to be supported by the standards 1 and 2 by means of brackets 11 and 12.

As shown in Figures 1 and 2, I provide an endless conveyor 13 made up of links 14, each of which is provided with a pair of oppositely extending arms 15 as shown in Figures 6 and 7. The arms 15 are substantially horizontal and are adapted to be supported by the horizontal portions of the rails 9 and 10. The conveyor is engaged at opposite ends by the sprockets 6 and 8 and motion is transmitted to the conveyor by the sprocket 6 driven from the motor 4. Each of the links 14 is provided with a vertical spindle 16 provided at its lower end with a pinion 17 for a purpose to be described. The upper ends of the spindles are provided with supporting members or cups 18 in which the articles of glassware are placed as shown in Figures 6 and 7.

The outer forward rail 9 is provided at spaced intervals with depending supporting members 19 secured at their lower ends to a rack bar 20 which extends throughout the greater portion of the length of the machine as shown in Figure 2. This rack bar is provided upon its inner face with teeth (not shown) adapted to mesh with the pinions 17 of the conveyor.

The numeral 21 designates a polishing burner comprising a substantially fan-shaped casing 22 as shown in Figure 3. This casing is relatively shallow and is divided into a plurality of fan-shaped chambers 23 by vertical walls 24. The upper and lower walls of the chambers 23 are connected by preferably integral pins 25 for a purpose to be described. The chambers 23 communicate at their forward ends with burner chambers 25′ as shown in Figures 3 and 6. The outer face 27 of the chambers 25′ is flat throughout its length and is provided with a series of drilled openings 28 arranged in rows as shown in Figures 6 and 9. Each of the chambers 23 is connected at its rear end with a valve 29 communicating with a manifold 30. Gas is supplied to the manifold 30 through a blower 31 and pipe 32 as shown in Figure 2. Gas is supplied to the blower through a pipe 33 and the blower is adapted to be driven by any suitable source of power such as an electric motor 34. The burner 21 is supported upon an adjustable standard 35 whereby the height of the burner may be adjusted by revolving a handle 36, according to the height of the ware being polished. A shield 37 of substantially L-shape is secured as at 38 to the forward edge of the burner 21. This shield is preferably filled with refractory material 39 such as fire clay or the like and this refractory material is adapted to confine flames from the nozzles 28 in close contact with the surfaces of the glassware.

The numeral 40 designates a glazing burner which is similar in construction to the burner 21 except that the forward wall 41 is provided with a single row of burner nozzles 42 arranged to project a thin sheet of flame across the upper edges of the glassware as shown in Figure 7. A shield 43 is secured to the burner 40 and this shield is filled with refractory material 44, the lower face of which is arranged slightly above the line of nozzles 42 and has its lower surface sloping downwardly and outwardly at a slight angle from the forward wall of the burner 40.

The burners 21 and 40 are arranged above and inwardly of the inner rail 9 and the faces 27 and 41 of the burners are arranged parallel to the rail. As shown in Figures 1 and 2, the burners are arranged in end to end relation and their inner ends are spaced apart. A hood 45 is arranged between the ends of the burners as shown. The hood 45 provides the heat dissipating means referred to and it comprises spaced substantially U-shaped inner and outer walls 46 and 47 respectively. The space between the walls 46 and 47 is closed by ends 48 as shown in Figures 10 and 11. The inner wall 46 is provided with a plurality of perforations 49 in its top and sides and air under pressure is fed to the space between the walls 46 and 47 through a pipe 50. The hood 45 is supported upon the rails 9 by means of depending arms 51.

The operation of the apparatus is as follows:

With the motor 4 running, the sprocket 6 is rotated in a counterclockwise direction to move the conveyor from left to right across the front of the machine as seen in Figures 1 and 2. The operator stands at the left of the machine and places the glassware to be polished and glazed upon the members 18 as the conveyor moves along. The ware is first carried beneath the shield 37 in front of the burner nozzles 28. The valves 29 are adjusted to deliver a relatively small amount of gas to the first chamber 23, an increasing amount to the second chamber 23 and a relatively large amount to the third chamber whereby heat areas of increasing intensity are provided within the shield 37 Thus it will be seen that as the glassware moves across the burner 21, it is progressively heated to the point where the surface roughness is fused and runs to form a smooth polished surface. From the burner 21 the ware moves into the hood 45. Fairly warm air is being continuously pumped into the space between the walls 46 and 47 of this hood. This air is fed outwardly through the openings 49 and against the surfaces of the glass from whence it passes downwardly and outwardly from the under side of the hood. This action dissipates the intense heat of the glasses so that the temperature of the latter is reduced to a point materially below the fusing point. From the hood 45 the ware is moved across in front of the burner 40, the valves of which are also adjusted to provide heat areas of increasing intensity. The temperature of the glasses is again gradually raised to the point where the edges of the ware is fused and runs as will be obvious.

If the glassware were moved directly from the burner 21 to the burner 40 the glasses would be heated by the latter to such an extent that they would soften and alter materially in shape. I have found that the provision of the heat dissipating means sufficiently reduces the temperature of the glasses so that they do not lose their form under the intense heat provided by the burner 40.

A second operator may be provided at the rear of the machine to remove the polished and glazed glassware as it passes from right to left or the operator at the left end of the machine may remove the glasses as they approach the left end of the machine and place them in trays or other suitable receptacles.

As shown in Figure 2, the rack bar 20 extends only across the front side of the machine from the inlet end of the polishing burner to the outlet end of the glazing burner. Thus it will be obvious that the pinions 17 are in mesh with the rack to revolve the glasware only during the time in which the glassware is being subjected to the action of the burners and the heat dissipating hood. The revolving of the glasses during this period permits the flames from the burners to act upon the glassware throughout the circumference of each piece. The spindles as will be obvious, do not revolve during the remainder of the travel of the conveyor thus saving unnecessary wear.

It is to be understood that the form of my invention herewith shown and described is to be taken as a preferred example of the same and that various changes in the shape, size, and arrangement of parts may be resorted to without departing from the spirit of the invention or the scope of the subjoined claims.

Having described my invention, I claim:

1. The herein described method of polishing and glazing glassware which consists in subjecting the ware to the action of a polishing burner, lowering the temperature of the ware, and subjecting it to the action of a glazing burner.

2. The herein described method of polishing and glazing glassware which consists in progressively subjecting the ware while continuously moving to the action of a polishing burner, a heat dissipating device, and a glazing burner.

3. A device of the character described comprising a burner, a heat dissipating member and a second burner arranged adjacent each other in the order named, and means for moving glassware progressively past said burners and said heat dissipating means.

4. A device of the character described comprising a pair of burners arranged in end to end relation and spaced apart, a heat dissipating member arranged between said burners substantially parallel thereto, and a conveyor for moving glassware past one of said burners, through said heat dissipating member and past the other of said burners.

5. A device of the character described comprising a conveyor adapted to support and move articles of glassware, a heat dissipating hood covering a portion of said conveyor, and a burner arranged on each side of said hood and adapted to project flames against the glassware.

6. A device of the character described comprising a conveyor adapted to support and move articles of glassware, a polishing burner, a heat dissipating hood arranged over said conveyor adjacent one end of said polishing burner, and a glazing burner arranged adjacent said hood, said burners having alined faces parallel to said conveyor and provided with burner nozzles.

7. A device of the character described comprising a conveyor adapted to support and move articles of glassware, a polishing burner, a glazing burner arranged in end to end relation with said polishing burner and spaced therefrom, said burners having alined faces arranged parallel to said conveyor and provided with burner nozzles, and a hood arranged over said conveyor between said burners, said hood comprising substantially inverted U-shaped spaced inner and outer walls, said inner walls being provided with openings, and means for supplying air to said hood.

8. The herein described method of working glassware which consists in subjecting the ware to the action of a burner to progressively heat the sides of the ware to its upper edges whereby the surface glass will be raised to a fusing temperature, subjecting the ware to the action of air currents to dissipate the heat and cool the ware to a temperature below its fusing point, and subjecting the ware to the action of a burner to progressively heat only the upper edge of the ware to a fusing temperature.

In testimony whereof I affix my signature.

ALBERT BREAKENRIDGE KNIGHT.